(Model.)    6 Sheets—Sheet 1.

G. F. McCOMBS & C. ROGERS.
Broom Sewing Machine.

No. 238,140.    Patented Feb. 22, 1881.

(Model.)

G. F. McCOMBS & C. ROGERS.
Broom Sewing Machine.

No. 238,140. Patented Feb. 22, 1881.

Witnesses
Inventors George F. McCombs
Charles Rogers
By Attorney George H. Christy (Model.)

G. F. McCOMBS & C. ROGERS.
Broom Sewing Machine.

No. 238,140. Patented Feb. 22, 1881.

Witnesses: C. L. Parker, A. H. Whittlesey

Inventors: George F. McCombs, Charles Rogers
By Attorney George N. Christy

N. PETERS, PHOTO-LITHOGRAPHER, WASHINGTON, D. C.

UNITED STATES PATENT OFFICE.

GEORGE F. McCOMBS, OF WASHINGTON, AND CHARLES ROGERS, OF ALLEGHENY, ASSIGNORS TO THE HAND STITCH BROOM SEWING MACHINE COMPANY, LIMITED, OF PITTSBURG, PENNSYLVANIA.

BROOM-SEWING MACHINE.

SPECIFICATION forming part of Letters Patent No. 238,140, dated February 22, 1881.

Application filed July 6, 1880. (Model.)

*To all whom it may concern:*

Be it known that we, GEORGE F. McCOMBS, of Washington, county of Washington, State of Pennsylvania, and CHARLES ROGERS, of Allegheny, county of Allegheny, State of Pennsylvania, have invented or discovered a new and useful Improvement in Broom-Sewing Machines; and we do hereby declare the following to be a full, clear, concise, and exact description thereof, reference being had to the accompanying drawings, making a part of this specification, in which—like letters indicating like parts—

Our present invention relates to certain improvements in that class of broom-sewing machines for which Letters Patent of the United States were granted to George F. McCombs, one of the present inventors, September 24, 1878, No. 208,407.

In this present invention, as in that patented as aforesaid, we provide for making a stitch, like that made by hand-sewing, by means of two needles arranged on opposite sides of the broom, each having an upward slope and direction of motion, so that the point of the needle shall enter the broom on one side below the binder and emerge on the opposite side above the binder, and thereby secure the "over and under cast" of the hand-stitch, and said needles being also arranged out of line, so that each needle may enter the broom at an advanced point of feed and emerge where the last preceding stitch was entered, thereby giving the same W form of advance to the stitch as is given in hand-sewing. This form of stitch and the upward slope of the needles by which the under and over cast of the thread are secured are clearly illustrated in Fig. 7. While the general arrangement of these needles is substantially the same as in the patent referred to, yet important improvements have been made in them, as well as in other operative parts of the machine. These we will now describe in detail.

The main frame of our improved machine consists of a circular base, $A^2$, four uprights or pillars, $A'$, and bed or table A. This frame we prefer to make of metal, and while the particular form shown is not essential, yet we prefer it, as giving compactness, stability, and convenience in making the requisite attachments of the working mechanism. Slots or openings $A^3$ and $A^4$ are made in the table A and bed $A^2$, both slots being in the same plane and opening on the same side. The lower opening, $A^4$, is to receive the end of the broom-handle, and the upper opening, $A^3$, is to permit the broom-holding vise to be passed into and out of working position.

We will now describe the broom-holding vise and the means by which it is operated.

Figures 3, 4:
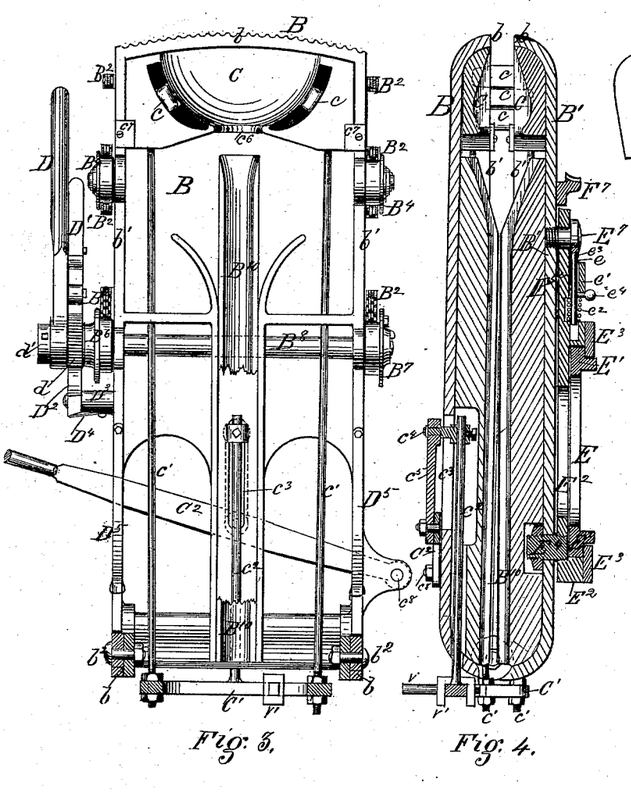
Fig. 3, Sheet 3, is a view, in elevation, showing, on an enlarged scale, the inside of one of the main jaws of the broom-holding vise.
Fig. 4 is a transverse sectional view through both jaws of the vise.
Figure 15:
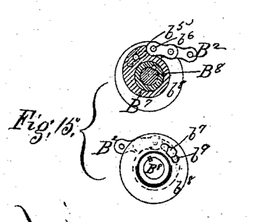
Fig. 15, Sheet 3, shows detached views, in section and in elevation, of one of the winding-drums, as hereinafter explained.

In this vise are two outer or main jaws, B B', having top flanges, $b$, and side flanges, $b'$, the edges of which abut when the jaws are brought together, thus inclosing a chamber or space, within which are arranged other devices, as presently described. The upper or clamping ends, $b$, of the jaws are rounded, both toward their side faces and also toward their edges, the latter curve by preference approximating that usually given to the seam on the broom. At the lower end the jaws are bent or rounded inward, and are connected by bolts $b^2$, passing through their edge flanges, thus making a kind of hinge-joint at those points, which allows the upper ends of the jaws to be closed or separated, as desired; but owing to the manner of supporting the vise, as presently described, the jaw B alone is movable for opening and closing, the other jaw being attached to a sliding support. This closing is effected by means of chains or cords $B^2$, Figs. 1 and 3, one of which is arranged on either edge of the vise. These chains are attached at their upper ends, by pins $b^4$ or otherwise, to the movable jaw B, as in Figs. 1 and 7; thence they pass over loose pulleys $B^3$, (one on each edge of the opposite jaw B',) thence over like pulleys $B^4$ on the first jaw, thence over like pulleys $B^5$ on the second jaw, B', and, finally, to winding-drums $B^6$ $B^7$ on either end of a shaft, $B^8$, which passes through the first jaw, B, from edge to edge, and is journaled on its edge flanges, $b'$, as clearly illustrated in Fig. 3. The attachment of the chains to the drums $B^6$ $B^7$ is made by giving the face of each drum a spiral form, as illustrated in Fig. 15, such spiral ending abruptly at a point where the distance from the lower to the higher face is about equal to the depth of the chain. A slot or recess, $b^5$, is made in this abrupt end, into which the end link of the chain is passed and secured by pin $b^6$. One of these drums, as $B^6$, is keyed to the shaft, the other, $B^7$, is loose on the shaft, and is secured by a bolt, $b^7$, to a collar or disk, $b^8$, which disk is made fast on the end of the shaft. This bolt $b^7$ passes through a slot, $b^9$, in the disk and into a threaded hole in the end of the drum $B^7$. By loosening the screw the drum may be turned on the shaft through the range of the slot $b^9$, and fastened at the desired point, thus winding or unwinding its chain a little without affecting the other chain, and thereby secure the same working length in each and insure the parallel relationship of the griping-jaws when closed on the broom. The spiral form of the drum-faces affords not only an attachment-point for the chains, as described, but also gives a continuous smooth winding-face, as the chains in winding form, in effect, a continuation of the spiral.

The shaft $B^8$ is rotated so as to wind up the chains by means of a hand-lever, D, which is journaled loose on the hub of ratchet-wheel $d$ or on the extended end of the shaft. This ratchet is keyed to the shaft, and the lever is held against it by a collar and set-screw, $d'$. The lever D is made to rotate the ratchet and shaft by means of a pawl, $d^2$, pivoted on the lever, and held to the periphery of the ratchet by spring $d^3$. A thumb-latch, D', is also pivoted to the side of the lever with its end abutting against the pivot-eye of pawl $d^2$. A notch, $d^4$, is made in the periphery of this eye, into which the end of the latch passes, and, pressing down the latch D', will lift the ratchet out of engagement.

In order to hold the shaft $B^8$ when force is removed from lever D, a pawl, $D^2$, is employed, which is pivoted on the end of stud $D^3$, projecting from the edge of jaw B. A heel-spring, $D^4$, under the eye of the pawl, which eye is given an angular periphery for the purpose, presses the pawl against the ratchet.

When it is desired to open the vise the lever D is pressed down sufficiently to relieve $D^2$, when it is thrown down by the hand until the spring $D^4$ bears against the other face of the angle at the base of the eye. The pawl is thus held out of engagement until it is again moved toward the ratchet. Then, upon releasing the pawl $d^2$ of lever D, as before described, the springs $D^5$, arranged between the jaws on either edge, will separate the jaws or open the vise. This mechanism for operating the jaws of the vise enables the operator to close them with great power, and thus compress the broom to the smallest practicable thickness, which is desirable, not only because it makes a better broom, but also because it enables the machine to make a tighter stitch.

The chains $B^2$ may be carried over a less number of pulleys, but such reduction would also reduce the power with which the jaws could be clamped. By arranging these chains and pulleys on both edges of the vise such edges are brought to bear on the broom with equal pressure.

Figure 5:
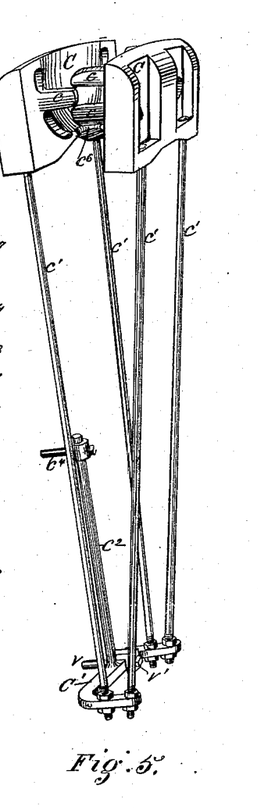
Fig. 5 is a perspective view of the inner clamping-vise, which, as hereinafter described, is arranged within or between the main jaws of the vise.
Figure 6:
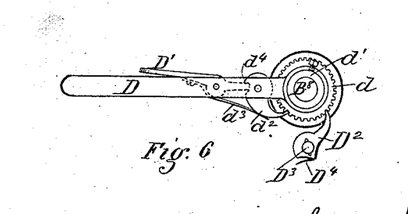
Fig. 6 is a detached view of the lever and ratchet used in operating the outer jaws of the vise, Figs 3, 4, 5, 6 being to the same scale.

On the inner face of each of the jaws B B' is formed a groove or half-round guide, $B^{10}$, in the vertical central line of the jaws for receiving the broom-handle; also, within or between the outer jaws, B B', is arranged an auxiliary vise, Fig. 5, having two jaws, C C, which are hollowed out on their inner faces so as to approximate in form to that of the waist or shoulder of the broom. Inwardly-projecting lugs $c$ $c$ are made on the inner faces of jaws C, and they are arranged to match between each other by alternate arrangement as the jaws are closed, thus forming edge walls or guards for securing the proper shape of the broom, which is clasped thereby. In this respect the inner jaws, C, operate on the inclosed part of the broom as a mold or former. These jaws C C are supported within the upper ends of jaws B B', as in Fig. 3, by means of rods $c'$ extending downward through openings in the lower ends of B B', and are united by a U-shaped bar, C', below the vise proper. From this bar a rod, $c^2$, is carried upward within the vise a short distance, in line with a slot, $c^3$, in the jaw B. A pin, $c^4$, and link $c^5$ (see Fig. 4) connect the rod $c^2$ with a hand-lever, $C^2$, Fig. 3, which is pivoted, as at $c^8$, to the outer face of the jaw B. By moving the lever $C^2$ the auxiliary vise C may be moved up and down within the vise B B', and by partially loosening the grasp of vise B B' upon the broom the broom may, by moving the vise C, be raised and lowered at will, so as to sew two or more different seams. When the broom is thus raised or lowered to the desired position it is locked, by passing the lever $C^2$ into engagement with a notched bar, $C^3$, or in other equivalent way, and the jaws B B' are again clamped upon it until the desired seam is sewed, as hereinafter described. We consider this auxiliary vise a great improvement upon the adjustable concave rest provided in the patent above referred to, as it not only gives form to the broom, but also takes a positive hold thereon, and thereby renders the shifting of the broom more certain.

The connection of rods $c'$ to the bar $C'$ may be by nuts, as shown, or by a hinged connection. In the case shown the holes in the U-bar which receive the rods are made large enough to afford the requisite range of motion. Guide-plates $c^7$ may be secured to the inner edges of flanges $b'$ (see Fig. 3) to keep the jaws C in place and allow the desired up and down motion. An opening, $c^6$, is made in the lower edge of each jaw to make space for the broom-handle.

Figure 1:
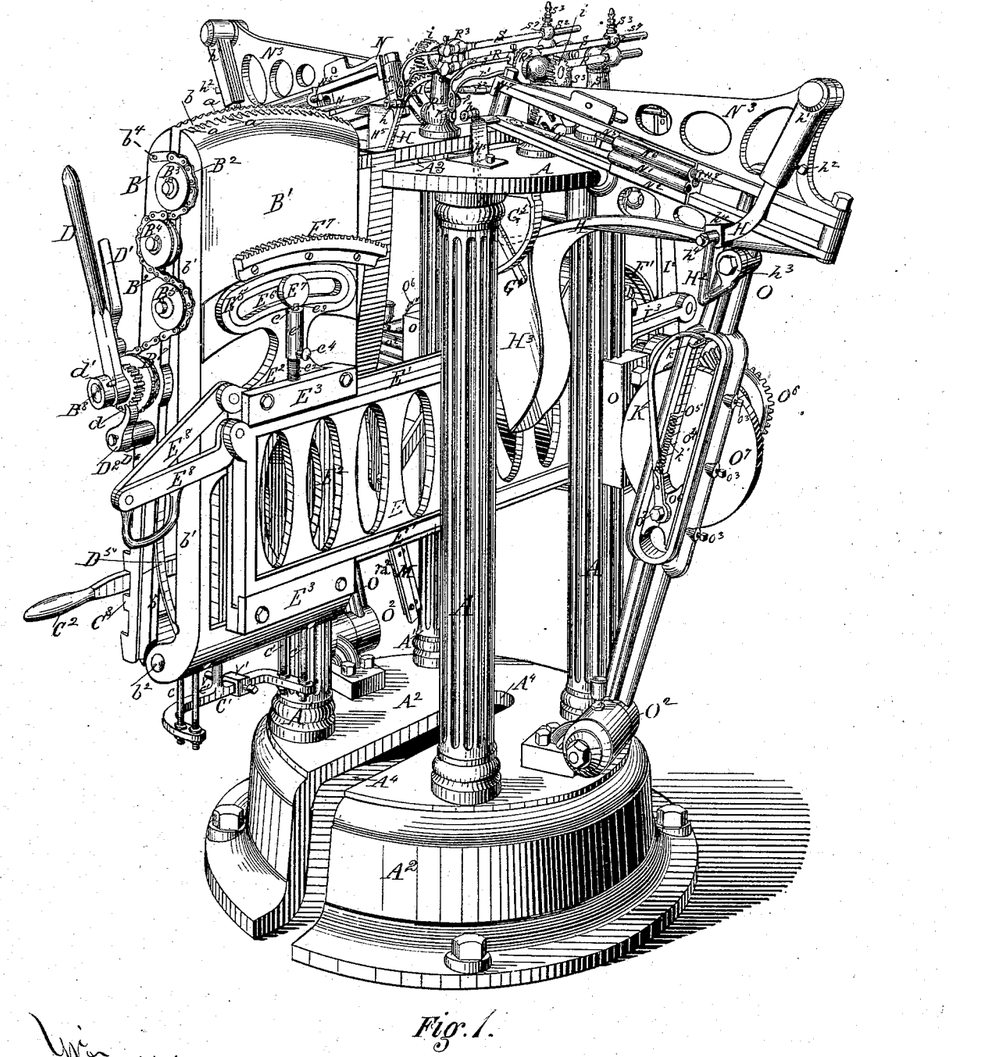
Figure 1, Sheet 1, is a front perspective view of our improved broom-sewing machine, showing the broom-clamping vise drawn out on its track or support for receiving or discharging the broom.

This vise is mounted as follows: A metallic bar, E, Fig. 1, is bolted to two of the frame-posts A' in line with the openings $A^3$ $A^4$. On the upper and lower edges of this bar E are formed or attached tracks E', which receive and carry a sliding block or frame, $E^2$, Figs. 1 and 4, the slide being held thereon by side plates, $E^3$. The vise-jaw B' is pivoted to this sliding block, so as to be movable on its pivot by means of a pin or bolt and nut, $E^4$, Fig. 4, which is located below the top of the vise a distance equal to the radius of the curve which it is desired to give to the seam on the broom. This pivot-bolt is screwed into a threaded hole in the block $E^2$, and the jaw B' is held on the bolt by the nut, thus providing a solid and substantial center of motion. If preferred, however, other suitable means may be employed for pivoting the vise.

On the upper edge of sliding block $E^2$ is erected an extension carrying a sector, $E^5$, having therein a curved slot, $E^6$, the center of the curve of which coincides with pivot $E^4$. A headed bolt, $E^7$, is passed through this slot and is screwed into the face of jaw B', thereby making a guide-support for the vise near its upper end, and allowing a range of motion of the vise on its pivot through the length of the slot. This range of motion is used for feeding the broom past the needles while being sewed, as will presently be described.

The vise is moved on its track E' into and out of working position in the machine by means of a jointed hand-lever, $E^8$, which has a hinged connection at one end with the outer end of bar E, and at its other end with sliding block $E^2$. The length of lever $E^8$ is such that when the vise is shoved into working position it is in nearly a straight line, and lies upon the top track-rail, E', in which position it operates as a lock to hold the block $E^2$ until the lever is raised by hand at its central joint and drawn back, drawing the vise with it, as in Fig. 1. When the vise is thus drawn out the broom is inserted and removed, and the binder is wound around and secured to the broom. This is done substantially as in the case of hand-sewing, a free end being left on the cord long enough to sew the required seam. In order to perform this work of putting on the binder with facility while the broom is clamped in the vise, we provide for locking the vise, by preference, in a vertical position by means of a bolt, $e$, Fig. 1, working through a guard, $e'$, fixed on the face of the sector-extension $E^5$. A spring, $e^2$, forces the bolt upward, so that its free end enters a notch, $e^3$, made in the head of bolt $E^7$. To unlock this bolt $e$ it is pressed down against the spring $e^2$ out of the notch, and then turned sidewise, passing its stud or knob $e^4$ under a side slot in the guard, as in the case of an ordinary door-bolt.

We will next describe the mechanism employed for giving feed motion to the vise and to the broom held therein.

Figure 16:
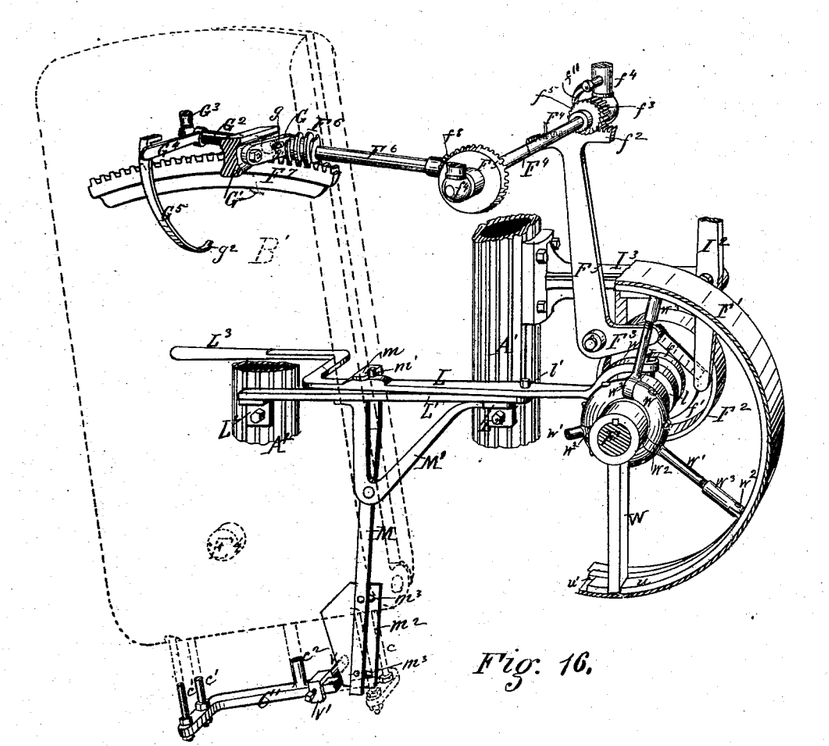
Fig. 16, Sheet 6, is an outline perspective view, to an enlarged scale, illustrative of the mechanism employed for giving feed-motion to the broom-holding vise, and also for throwing the entire machine out of gear.
Figures 17, 18, 19, 20:
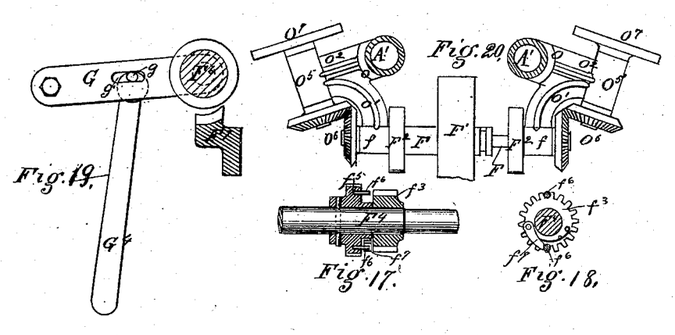
Figs. 17, 18, and 19 are detached views, to an enlarged scale, of parts of the mechanism, as hereinafter described.
Fig. 20 is a plan view, showing the supporting-brackets of the driving-shaft and needle-operating-shafts.

A driving-shaft, F, is journaled, as at $f$, on brackets $o'$, (see Fig. 20,) extending backward a little from the two rear posts of the machine. This shaft is driven by a band-wheel, F', as hereinafter described. Secured on the shaft is a wheel, $F^2$, Fig. 16, having in its side face a cam-groove, $f'$, adapted in form to give to bell-crank lever $F^3$, which works therein, a reciprocating or vibrating motion, with a period of rest between each vibration. On the upper end of lever $F^3$ is formed a geared sector or curved rack, $f^2$, which gears into a pinion, $f^3$, running loose on a shaft, $F^4$, which shaft is journaled in pendants $f^4$ on the under side of table A. A ratchet-wheel, $f^5$, is secured on the shaft by pin or key, and on its face, adjacent to pinion $f^3$, are pins or stops $f^6$. A pawl and spring, $f^7$, are arranged on the adjacent face of the pinion in such relation that as the pinion is rotated in one direction the pawl will engage one of the stops and give shaft $F^4$ a part rotation; but as the pinion rotates in the opposite direction (on the reverse movement of the rack) the spring will yield and allow the pawl to pass the stops, the ratchet being held by a pawl, $f^{11}$, Fig. 16. The arrangement of these devices is shown in detail, Figs. 17 and 18. Thus an intermittent rotary motion is given to shaft $F^4$ by the vibration of the rack.

A bevel-gear wheel, $F^5$, keyed on the shaft, gears with a similar pinion, $f^8$, on the worm-shaft $F^6$. The end of this worm-shaft next to $F^4$ is journaled in a globe or sleeve bracket, $f^9$, Fig. 2, which encircles shaft $F^4$, bearing against the hub of wheel $F^5$ on one side and against a bound collar, $f^{10}$, on its other side. The opposite end of the worm-shaft can thus be moved up or down, and this movement is employed to put the worm into and out of gear with a rack or sector, $F^7$, on the face of the jaw $B'$ of the vise. The intermittent rotary motion given to shafts $F^4$ $F^6$ communicates a corresponding motion to the vise on its pivot when the worm and sector are in gear. The extent of this motion determines the length of stitch as it moves the broom past the needles, and this can be regulated by varying the relative sizes of gear-wheel employed in transmitting the motion. The worm end of shaft $F^6$ is journaled in the end of an arm, G, which arm is pivoted at its other end to a rib, $G'$, Fig. 16, on the under side of the table A. A rock-shaft, $G^2$, has one end journaled in a pendant, $G^3$, and its other end passes through the rib $G'$, and on the end of this rock-shaft is a crank-pin, $g$, which works in a slot, $g'$, in the arm G. (See Fig. 19.) By means of a hand-lever, $G^4$, this rock-shaft can be moved, and thereby carry the worm end of shaft $F^6$ into and out of engagement with the sector $F^7$. A curved bar, $G^5$, Figs. 1 and 16, secured to the under side of table A, affords, by means of notches $g^2$ on its edge, a convenient lock to secure lever $G^4$, so as to hold the worm either in or out of gear.

When it is desired to slide the vise on its track, or at the completion of each seam, the worm is thrown out of gear by pressing lever $G^4$ downward, as in Fig. 1. Then to set the vise for the beginning of a seam, (it being slid on its track into place,) it is turned on its pivot inward toward the center of the machine until the upper or forward edge of the broom is in proper position for the leading needle to pass through it where the first stitch is to be made. The vise being so adjusted the worm is dropped into gear by raising the lever $G^4$, as in Fig. 16, and the mechanism thus far described is then ready for operation in sewing the broom, the feed motion of the broom in such sewing being toward the front of the machine.

We will next describe the needles and the mechanism employed for operating the same.

Figure 7:
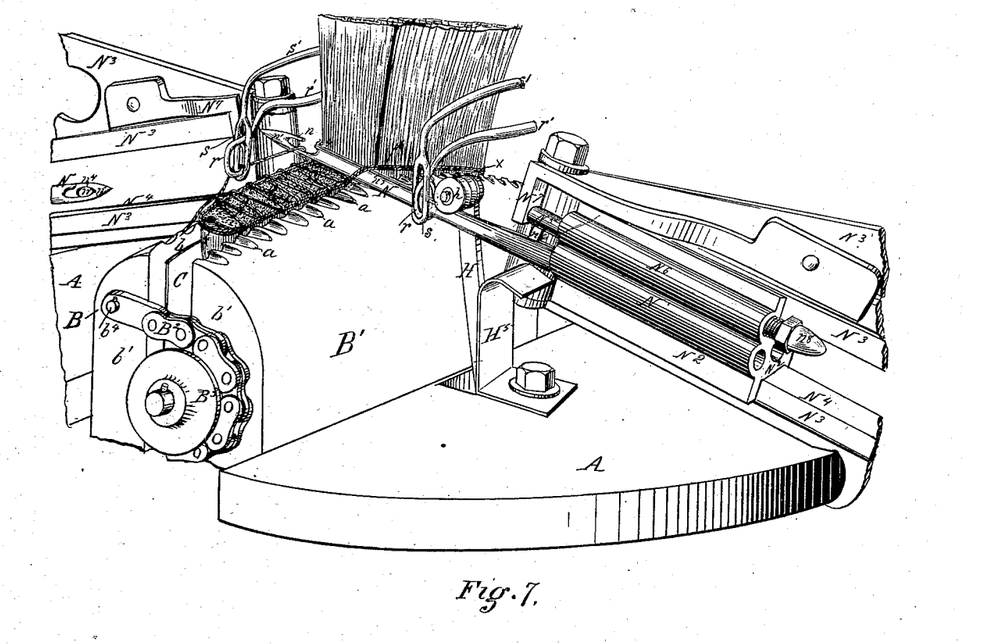
Fig. 7, Sheet 4, shows, in perspective, a detached portion of the mechanism most directly operative in forming the stitch, the scale of the same being considerably enlarged.

Two needles, N N, are used, one on each side of the broom. They are duplicates of each other, and therefore we have designated both, with their connections, by like letters. These needles are in general form and function similar to those described in the patent before referred to. They are secured in tubular sockets $N'$, formed on the side of sliding blocks $N^2$. These slides are supported and guided in slotted frames or castings $N^3$, the slides being fitted to the tracks $N^4$ of the slots by grooved ways, as shown in Fig. 7, or in other convenient way. The web-shaped castings $N^3$ are bolted securely to the upper and under side of the table A, in such position and adjustment that the needles shall have an upward slope and direction of motion toward the central line of the machine, and also an inclination toward the front of the machine. The left-hand needle is, however, placed nearer the front of the machine than the other, this difference being equal to one-half the feed motion given to the broom at one operation of the feed mechanism. This slope and inclination is clearly represented in Figs. 1 and 7. The upper slope is such as to cause the needle entering the broom below the binder $x$ to emerge on the opposite side of the broom above the binder, as illustrated in Fig. 7, thus giving an over and under cast to the stitch, as there shown. The forward inclination of the needles is regulated by the amount of feed motion given to the broom and by the difference in their arrangement with respect to each other, as above stated; and this relative adjustment is such that each needle may enter the broom at its advance point of feed and emerge on the opposite side at the point where the previous needle entered, thus making a W-shaped stitch, as at $x'$, Fig. 7. By this arrangement of the needles we secure a stitch exactly like a hand-stitch, and this we do without giving to the broom any motions except its intermittent feed in a single plane, and this feed is given at one operation for both needles; or, in other words, both needles complete their stroke or operation in forming a stitch after one feed motion is given and before another feed motion takes place, the order being, first, the feed; second, the operation of the left-hand or forward needle, and, third, the operation of the right-hand or following needle. Each needle is driven by means of a vibrating lever, O, which is connected at its upper end by a link, $O'$, to sliding block $N^2$, and at the lower end is pivoted, as at $O^2$, to base-plate $A^2$, its arrangement and position being such as to cause it to move in the same vertical plane as the needle. At right angles to this plane is journaled a short shaft, $O^4$, by means of a long box, $O^5$, on the bracket $o^2$, Fig. 20. This shaft is geared to the driving-shaft F by bevel-gearing $O^6$. On the other end of shaft $O^4$ is a disk or crank wheel, $O^7$, with wrist $o^7$, working in a box, $o^6$, which box slides up and down in a guide-slot, $o^5$, in the lever O, whereby the rotation of the crank-wheel gives a forward and backward movement to the needle.

In order to secure smooth working of boxes $o^6$ in slots $o^5$, the side faces of the slots are bushed or lined with steel plates $o^4$, which are adjusted by set-screws $o^3$, so as to preserve parallel arrangement and proper tension. The angle between the driving-shaft F and each of the shafts $O^4$ is, owing to the inclined arrangement of the needles, greater than a right angle, the object being to bring the shafts $O^4$ at right angles to the plane of motion of the levers O, as before stated. The brackets which support these shafts are shown in detached view, Fig. 20. They have two supporting-arms, $o'$ and $o^2$, (one for each shaft,) extending out from a common bearing or base, $o$, which is bolted to the supporting-posts $A'$, as in Fig. 2.

Figures 8, 9, 10, 11:
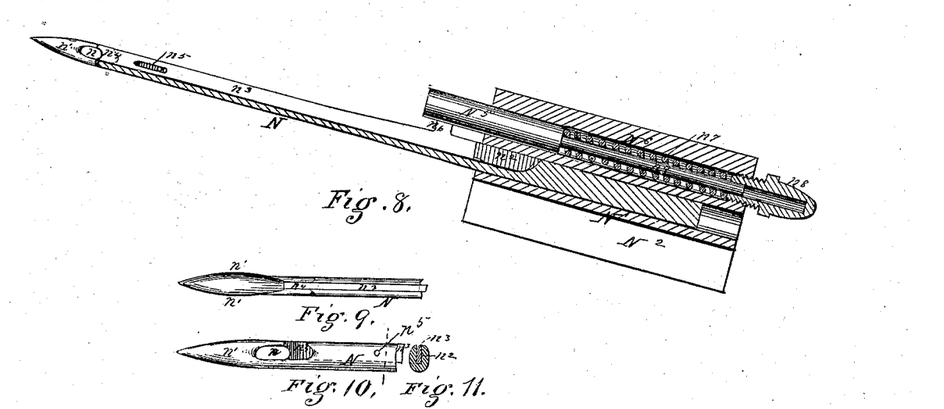
Fig. 8 is a longitudinal sectional view, to a still larger scale, of one of the needles and needle-blocks.
Figs. 9, 10, and 11 are detail views illustrative of the construction of the needles.

With the exception of form due to right-and-left arrangement, and the different distances from the front of the machine at which the respective needles work, the mechanism for driving the needles is the same on both sides of the machine; but the wrist-pins $o^7$ are so adjusted with relation to each other that the two needles alternate in their movements, and the needle on the left hand of Figs. 1 and 7 advances first to make a stitch; and for this reason, and also because it is arranged to enter the broom at a point nearer the front of the machine than the other, as before described, is termed "the leading needle." The penetrator or point of the needles is formed of substantially the shape described in the patent before referred to—that is, it tapers forward and also backward somewhat from a swell, $n'$, just in advance of the eye $n$, as illustrated by the separate enlarged views, Figs. 9 and 10. The eye is elliptical in form, and its edges are rounded to avoid cutting angles. We have, however, added in the present invention a device for opening and closing the eye automatically, which we consider an important improvement.

To this end a narrow groove, $n^2$, Figs. 8 and 11, is made in the upper edge of each needle-shaft, extending backward from the eye, by preference, to or within the socket $N'$, which holds the needle. In this groove is arranged a sliding bar, $n^3$, its outer edge being flush with the surface of the needle-shaft, and its forward end, $n^4$, having a rounded shape, adapted to form the rear end and part of the top of the eye. The front end of this sliding bar may be held and guided by slot and pin $n^5$. Near its rear end a stud, $n^6$, extends upward into a mortise in a bumper, $N^5$, which is guided and supported in a tubular socket, $N^6$, which, like the socket $N'$, is formed on the side of block $N^2$. A spring, $n^7$, and adjusting-nut $n^8$ are arranged back of the bumper, and a rod, $n^9$, guides it in its movement. The tension of spring $n^7$ presses the bar $n^3$ forward, so as to close the needle-eye. To overcome this spring-pressure and open the eye at the desired point an adjustable stop, $N^7$, is bolted to the upper web of casting $N^3$, against the downwardly-bent end of which the bumper $N^5$ strikes, and thereby arrests the further advance of the sliding bar $n^3$. This is arranged to occur, by preference, just as the eye emerges from the opposite side of the broom. The bar $n^3$ being held stationary by the stop, a further advance of the needle will result in opening the eye on its upper side, when the cord or thread is passed into the eye, as represented in Fig. 7. As the needle is drawn back the eye is again closed by the spring $n^7$. Several advantages are secured by this arrangement, as all danger of tangling the corn by catching on the needle is avoided, as also all danger of unthreading the needle, and especially the binder $x$ is prevented from entering the eye as the needle-point passes under it on entering or leaving the broom.

We will next describe the mechanism for threading the needles.

Figure 2:
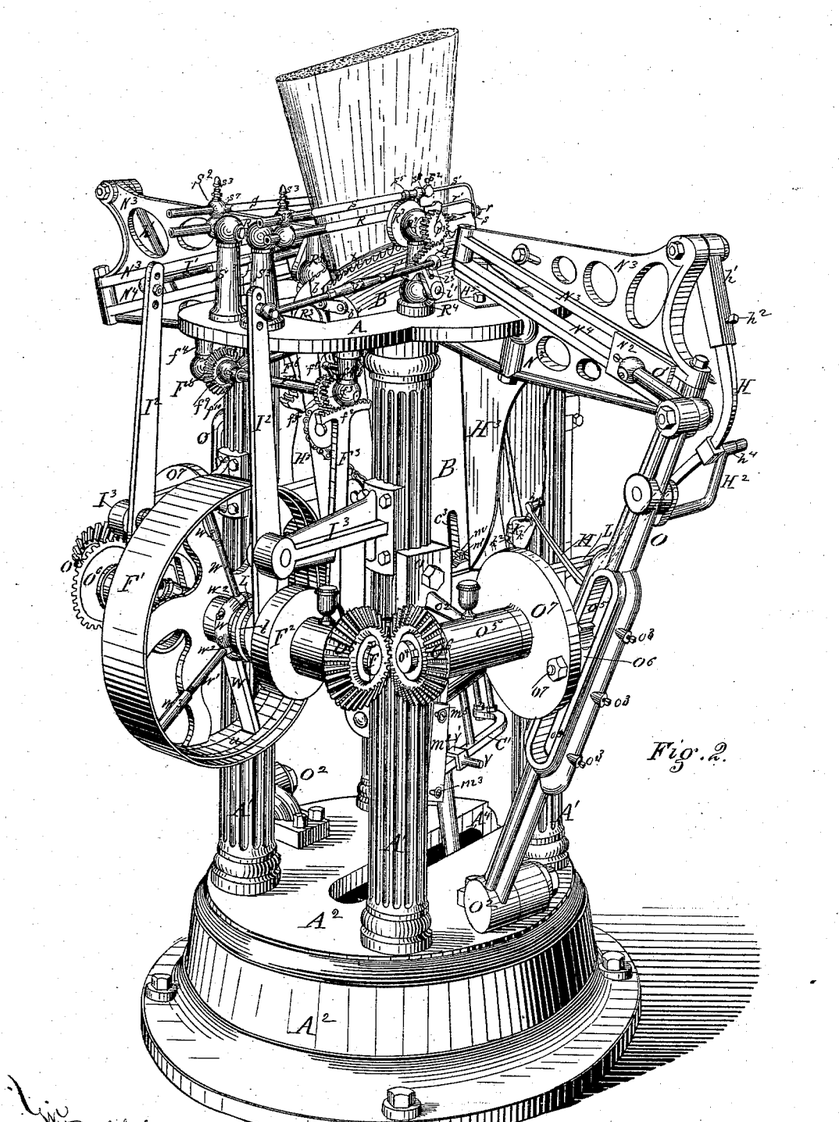
Fig. 2, Sheet 2, is a rear perspective view of the machine, but showing the side opposite that shown in Fig. 1, and also showing the vise and broom in position for sewing.
Figures 12, 13, 14:
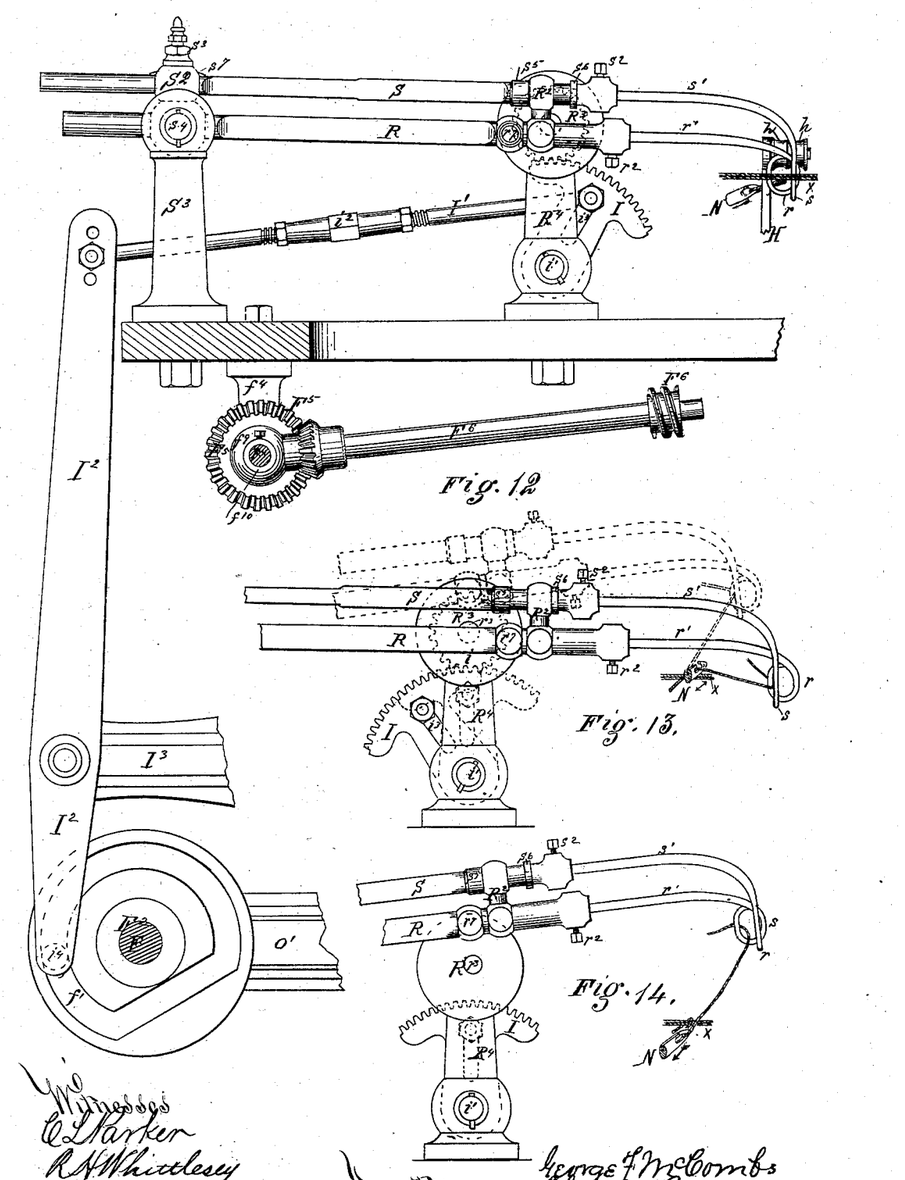
Figs. 12, 13, and 14, Sheet 5, are enlarged outline views, in elevation, all to the same scale, of the threading and tension mechanism, and illustrative of the different movements made in its operation.

This mechanism, like that of the needles, is duplicated, one set being arranged on each side of the broom, and the same plan of lettering the various parts will be followed. The thread-holder consists of a ring, $r$, and a flattened loop, $s$, each being formed on the downwardly-bent ends of their respective wires $r'$ $s'$. The loop fits over or encompasses the ring, as in Fig. 7, and has a motion in common with the ring. The ring has also an additional motion through the loop, the two limits of this latter motion being shown on the right and left hand sides of Fig. 7, and both motions being illustrated by the detail views, Figs. 12, 13, and 14, Sheet 5. Before describing in detail the function of these different movements we will describe the mechanism by which they are imparted. The wires or rods $r'$ $s'$ are bound by set-screws $r^2$ $s^2$ in the tubular ends of rods R S, and their relative endwise adjustment may be varied by adjustment in their binding-sockets. These two rods are coupled together, near their rear ends, by a perforated standard, $S^2$, through which the rods slide back and forth. A gib-spring, $s^7$, and set-screw $s^3$, bind the rod S sufficiently to cause a little friction and retard its movement somewhat, the purpose of which will presently be described. A pivot, $s^4$, affords a jointed connection between the post $S^3$ and coupling $S^2$. Toward the front these rods are again coupled in parallel relation by a similar coupling or connection, $R^2$, except that it is free to move back and forth on the rod S, between the collars $s^5$ $s^6$. Just back of the connection $R^2$ a crank or wrist pin, $r^7$, connects rod R with an oscillating disk-wheel, $R^3$. This disk is carried on the end of a short shaft, $r^3$, which is journaled in the upper end of the post $R^4$. On the outer end of this shaft is a pinion, $i$, gearing with a seetor, I, which, in turn, is pivoted by bolt $i'$ to the lower end of post $R^4$. An extensible pitman, $I'$, connects this sector with the upper end of a vibrating lever, $I^2$. By means of the extensible coupling $i^2$ the length of the pitman can be adjusted, and by means of the slot-connection $i^3$ the effect of its throw in giving motion to the sector can be regulated at pleasure. The lever $I^2$ is pivoted to a bracket-arm, $I^3$, and at its lower end a wrist-pin, $i^4$, works in the cam-groove $f'$ of the wheel $F^2$, Figs. 12 and 16. The vibratory motion thus given to the lever $I^2$ imparts through the sector and pinion an oscillatory motion to the wheel $R^3$, which causes the ring $r$ and loop $s$ to move in a curved path. The range of their vertical motion will be greater than that of crank-pin $r^7$, owing to their greater distance from the common pivot $s^4$. The extent of back-and-forth or horizontal movement of ring $r$ will equal that of crank-pin $r^7$, while the same movement of loop $s$ will be less than that of the ring by the range allowed between the collars $s^5$ $s^6$. In thus moving both rods slide in the coupling $S^2$, though not to an equal extent, since the tension of gib-spring $s^7$ holds rod S at this point until the coupling $R^2$ has passed from $s^5$ to $s^6$, and the gib-spring is employed for this special purpose. The form of the cam-groove $f'$ is such as to give a period of rest between successive strokes of the device. While resting at the limit of its back-stroke the ring $r$ is drawn back through the loop, as in Fig. 12, and at the right hand of Fig. 7; also, the uncovered ring encircles the path of motion of the needle on the same side, so that this needle, as it advances, passes through such ring, as illustrated on the right of Fig. 7. While the needle is in the position here shown, it is threaded by the movement of the ring $r$ on the left-hand side. In describing this threading movement it is assumed that the thread passes through the ring and under the binder. As the point of the needle emerges from the broom above the binder the ring and loop are moved upward and forward by the movement of wheel $R^3$, carrying the thread over the point of the needle and into the opened eye, as represented on the left of Fig. 7, and by dotted and full lines, Fig. 13; but, further, the ring, during the first part of its forward stroke, passes through the loop from the relative arrangement shown on the right to that on the left of Fig. 7. This is due to the range of slide from $s^5$ to $s^6$, as before explained, and by means of it the thread is bound tight between the loop and rear side of the ring, as in Fig. 13. Then, as these devices complete their forward throw—say, from the position shown in dotted lines to that shown in full lines, Fig. 13—the thread is drawn tight through the broom and over the needle. While the tension is thus held at the forward limit the needle begins its back-stroke, thereby closing its eye over the thread and drawing back a little on it to insure a tight stitch. By thus holding the thread tight not only is a tight stitch secured, but all danger or possibility of unthreading the needle before its eye is closed is avoided. As the needle on its back-stroke draws tightly on the thread the grasp of $r$ $s$ is relaxed. This point in the movement is intermediate between those of Figs. 13 and 14. This relaxing is caused by the upward and backward movement of the ring and loop, since in such backward movement the rod R first moves backward from the front collar, $s^6$, to the back collar, $s^5$, thereby changing the loop and ring from the relative positions of Fig. 13 (full lines) to those of Fig. 14. The cord is then free to be drawn through the ring by the return of the needle; also, by the upward movement of the ring on its back-stroke the free end of the thread is raised, as in Fig. 14, (the closing of the eye preventing the unthreading of the needle in this operation,) so that the free cord is drawn through the broom on top of the stitch. This is an important feature, since by this means the free thread is prevented from becoming bound under the tight stitch. Without this precaution the two parts of the thread might interfere and either break or stop the machine. As the needle draws back the thread is drawn with it through the ring on the needle's side of the broom, or (in the case supposed) on the right of Fig. 7, and the threader and tension $r$ $s$ on the left, the movements of which we have been describing, moves to the rear limit of its motion, in position to receive, in turn, its adjacent needle when it shall be advanced. As the retreating needle reaches or approaches its complete return it is unthreaded by drawing the free end of the thread through the eye. This is done by means of a reciprocating arm, H, Figs. 1, 2, 7, and 12, which carries on its upper end two rollers, $h$ $h$. The cord is doubled, as in Fig. 12, as it is drawn from the broom, and the two strands tend to give motion to a roller in different direction. By providing a roller for each strand they are free to take motion from their respective strands, and thereby facilitate the unthreading operation. The arm H is bent or curved so as to pass down under the table A, and then outward and upward to a pivotal connection, $h'$, with the corner of casting $N^3$, the end of the arm, being secured by set-screw $h^2$ in the socket of the joint or pivotal connecting-piece $h'$, so that the arm may be lengthened or shortened thereby. Reciprocating motion is given to the arm, so as to carry the rollers above and below the path of the needle, as in Figs. 2 and 7, by means of a bent rod, $H^2$, bolted at one end, as at $h^3$, to the lever O, which actuates the needle, and at the other end it is pivoted to a slide, $h^4$, which moves on the arm. The length of throw given the arm can be regulated by varying the position of the rod H, so as to cause the slide to bear on the arm at different points. If desired, this throw may be sufficient to unthread the needle and draw down the free end of the cord; but we prefer to add another device for disposing of the whip end of the cord when it is long. This consists of a bent arm, K, secured at its end to the wrist $o^7$, so as to revolve with the wrist and also around it. In the free end of this arm is made a socket, in which is arranged the stem of a bent hook, $k$. A spring, $k'$, connects the base end, $k^2$, of this hook (see Fig. 2) with the arm near its connection with the wrist $o^7$, and by its tension holds the hook at right angles to the plane of motion of the arm, but yet allows the hook to turn or yield in order to pass an obstruction. As the end of the cord is drawn out of the broom and from under the rollers $h$, but a single strand or loop is left around the roller, and the rotary hook-arms are arranged to take the cord soon after the end of the cord passes the roller, or as it is withdrawn out of the needle-eye, as represented in Fig. 2. In doing so the hook $k$ turns aside to pass the arms H, but immediately returns to position to engage the cord, and by its rotation whips the cord out straight, leaving it in the spouts or guards $H^3$, which latter are secured to table A. The position of the free cord is then from the under side of the binder $x$, through the ring $r$, (on the side of the needle which has been in operation,) thence down the spout $H^3$. This is the disposition which the cord was assumed to have at the beginning of the description of the threading operation, and it is therefore in proper position to operate on the other needle when it shall advance through the broom. In doing so the operation above described is repeated, (but on the other side of the broom,) and so on till the sewing is completed. Before starting the sewing the cord is drawn, by hand, through the right-hand ring, $r$, (the left-hand needle being the first to advance,) and consequently in arranging the binder for the seam the free cord is left on the right hand of the broom, and it is tucked under and brought out from the under side of the binder.

The devices for unthreading the needles and straightening out the cord are duplicated, one set on each side of the machine, and we have designated corresponding parts by the same letter, as heretofore, in this description.

In order to prevent downward strain on the needles as they are unthreaded, guards $H^5$ are erected from the table, on either hand, over the tops of which the cord is drawn.

In order to support the binder in place and insure the entry of the needles under the same, grooves $a$ are made in the jaws B B', their direction being in the line of motion of the needles. The points of the needles take these grooves in succession, and the binder lying above, on their ridges, the needles make a sure entry under the binder.

In machines of this class which are driven by power mechanism it is important that provision be made for throwing the machine out of gear promptly. We have devised means for doing this almost instantaneously, as follows: A band-wheel, F', is mounted loose on the shaft. In the inner face of the rim of this wheel is made a circumferential groove, $u'$, in which is seated an open or cut metallic band, $u$, which is free to expand and bind against the inner face of the wheel, or to contract and thus release the wheel. A bar, W, is rigidly secured to the shaft and extends radially outward to, or nearly to, the bottom of groove $u'$, so that the ends of the open band $u$ may bear against said arm. Aside from such end contact there is no direct connection between the wheel and arm; but when the band $u$ is pressed against the wheel it will turn with the wheel, and its end abutting against the fixed arm W it will thereby give motion to the shaft, or, when the band is released, the wheel F' will run loose on the shaft, which latter will remain stationary. In order to expand and contract the band promptly and with force or power a hub or sleeve, $w$, is arranged to slide on the shaft, and radial rods $w'$ connect this sleeve, by jointed connections $w^2$, with the band $u$. The length of these rods $w$ can be varied or adjusted by means of the extensible socket-connections $w^3$. Their length is made such that, just before coming to a common plane, by the movement of the sleeve $w$ they shall expand the band $u$ to the required extent. Then by a reverse movement of the sleeve the band will be released. These movements are imparted by means of a forked lever, L, Fig. 16, playing in groove $l$, and pivoted, as at $l'$, to the rear end of a plate, L', which plate is supported on angle-pieces $L^2$, bolted to the posts A'. The front end of this lever is bent to pass the front post, and terminates in an operating-handle, $L^3$.

To a brace, M', on the under side of plate L' is pivoted a lever, M, the upper end of which is bent over the lever L, and a keeper or catch, $m$, is made in such bent end into which a stud or pin, $m'$, on lever L is passed, to hold the lever, when moved to position, to bind the friction-clutch on the drive-wheel. The lever M carries a preponderance of weight below its pivot, which moves the lever into engagement with the stud $m'$.

On the lower end of lever M is bolted a plate, $m^2$, through transverse slots $m^3$, and on the U-shaped bar C' of the inner adjustable vise C C is secured a trip-pin, $v$. This pin is made adjustable by clamp $v'$, and can be set at different positions on the bar. It is so adjusted with relation to plate $m^2$ that it shall strike or engage the same as it is moved in that direction by the feed-motion of the vise, and by means of the possible adjustments of the trip and plate this engagement can be made to occur at the completion of the seam on the broom. Such engagement moves the catch $m$ out of engagement with the pin or stud $m'$, and thereby allows the lever L to move back and the friction-clutch to relax.

It is customary to sew two or more seams on a broom, and these are of different lengths, owing to the fan shape of the broom. We have already described that by raising and lowering the inner vise, C C, the broom may be brought into position for such seams. This adjustment will also raise and lower the pin $v$. The plate $m^2$ is therefore made long enough to allow such adjustment. And to provide for throwing the machine out of gear automatically at the completion of the short as well as the long seams the plate $m^2$ is set at such inclination that the pin $v$ may strike it at the completion of the seam in whatever plane the pin may be moving—or, in other words, whether it is adjusted in position for a long or for a short seam.

In many cases it is preferable to operate the lever L by hand, both in throwing the machine out of as well as into gear. In such case the lever M may be tripped by the foot or hand of the operator by means of any convenient operating-lever.

The machine as thus organized we have found to be a great improvement on the one described in the patent hereinbefore referred to, and we believe it to be a great improvement upon any machines heretofore in use for sewing brooms.

We claim herein as our invention—

1. In a machine for sewing brooms, a broom-holding vise having having two hinged jaws, B B′, in combination with pulleys B³ B⁴, in any desired number, arranged on both edges of such jaws, flexible chains B², secured at one end to one of the jaws on its opposite edges, passing thence over the pulleys, and secured at their other end to winding-drums, the latter being carried on and receiving motion from a common shaft, and mechanism for rotating such shaft, substantially as set forth, whereby power for closing the vise is communicated to both its edges.

2. The combination, with the vise B B′, of pulleys B³ B⁴ B⁵, shaft B⁸, and winding-drums B⁶ B⁷, said drums having a spiral-shaped winding-face, which spiral terminates in an abrupt slotted end, $b^5$, adapted to receive and secure the end of the chain, substantially as described, whereby the chain, as it is wound upon the drum, forms a continuation of the spiral face of the drum.

3. In combination, the vise B B′, clamping-chains B², arranged, as described, on both edges of the vise, pulleys B³ B⁴, winding-drums B⁶ B⁷, and shaft B⁸, one such drum being secured to the shaft by means of a separate fixed disk, and an adjustable binding mechanism for connecting the disk and drum, substantially as and for the purpose set forth.

4. In combination with the clamping-jaws B B′, pulleys B³ B⁴, chains B², and winding-shaft B⁸ of a broom-holding vise, a ratchet-wheel, $d$, fixed to the shaft, an operating-lever, D, having pawl $d^2$, with spring $d^3$ for holding the pawl in engagement with the ratchet, and thumb-latch D′ for throwing it out of such engagement, and locking-pawl D², substantially as described.

5. In combination with the outer jaws, B B′, of a broom-holding vise, an auxiliary vise arranged within or between such outer jaws, the jaws of the inner vise being adapted to grasp or inclose the shoulder of the broom, and having a range of adjustment up and down within the outer vise, with mechanism for effecting such adjustment, substantially as set forth.

6. The combination of vise B B′, sliding support E², the vise having a pivot-connection near its lower end with the slide, and adapted to move therewith into and out of working position in the machine, with slotted sector E⁵, bolt E⁷, and mechanism for locking the vise as against motion on its pivot while arranging a broom in the vise for sewing, substantially as set forth.

7. The combination of a pivoted broom-holding vise having a gear sector or rack, F⁷, thereon, a worm and shaft, F⁶, arranged to gear with the sector, pivoted arm G, in the free end of which is journaled the worm end of the shaft, and mechanism for moving arm G on its pivot, substantially as and for the purpose set forth.

8. The combination of pivoted vise B B′, having sector or rack F⁷ thereon, worm-shaft, F⁶, counter-shaft F⁴, gearing F⁵ $f^8$, ratchet $f^5$, pinion $f^3$, with stops and pawl $f^6$ $f^7$, as described, rack-lever F³, cam-wheel F², and driving-shaft F, substantially as set forth.

9. The combination of slotted guide N³, sliding block N², arranged to move in the slot of the guide, tubular sockets N′ N⁶, formed on the slide N², needle N, secured in one of the sockets, the needle having arranged in its shaft a sliding bar, $n^3$, for opening and closing the needle-eye, a movable bumper, N⁵, and spring $n^7$, arranged in the other socket of N, with a rigid connection between the bar and bumper, and a stop, N⁷, arranged in the line of motion of the bumper to arrest its forward motion, substantially as and for the purpose set forth.

10. In combination with the needle of a broom-sewing machine, a cord-holder and tension mechanism consisting of holder $r$ and an encircling ring or loop, $s$, with mechanism for giving to the holder movement back and forth through the ring or loop, substantially as described, whereby the sewing-cord is bound in the holder while the needle tightens the stitch.

11. In combination with the needle of a broom-sewing machine, a cord-holder arranged in front of its needle, and mechanism for moving the holder upward above such needle as the needle is withdrawn from the broom, substantially as set forth, whereby the free cord is drawn through the broom above or outside of the stitch.

12. In a machine for sewing brooms having two sewing-needles, and in combination with such needles, a cord-holder and tension device consisting of a holder, $r$, having a form adapted to the passage of a needle through the same, and a loop, $s$, encircling the holder, with mechanism for giving to the holder movement back and forth through the loop, and simultaneously therewith giving to both ring and loop reciprocating motion in a curved path into and out of the path of one needle and over the point of the other needle, substantially as and for the purpose set forth.

13. The combination of rods R S, carrying thereon the ring and loop $r$ $s$, pivoted connection S², through which both rods slide, connection R², fixed to one rod and having a limited range of slide motion on the other rod, crank-wheel R³, and a binding or friction device for retarding, to a limited degree, the freedom of motion of rod S through its rear connection, S², substantially as set forth.

14. The combination, with the needle of a broom-sewing machine, of the pivoted reciprocating bar H, carrying on its free end one or more loose rollers, $h$, lever O, rod $H^2$, and slide $h^4$, substantially as and for the purposes set forth.

15. In combination with the reciprocating unthreading-arm H, a rotary hook-arm, K, arranged as described, and adapted by its motion to take the cord from such arm and straighten out its free end, substantially as set forth.

16. In combination with the rotary crank-wheel $O^7$ and whip-arm K of a broom-sewing machine, a yielding hook, $k$, seated in the end of the arm and movable in its seat, with spring $k'$, connecting the base of the hook with the arm, substantially as and for the purpose set forth.

In testimony whereof we have hereunto set our hands.

GEO. F. McCOMBS.
CHAS. ROGERS.

Witnesses:
R. H. WHITTLESEY,
FRANCIS L. CLARK.